United States Patent [19]

Gilbu

[11] 3,984,271
[45] Oct. 5, 1976

[54] METHOD OF MANUFACTURING LARGE DIAMETER TUBULAR STRUCTURES

[75] Inventor: Agnar Gilbu, Conroe, Tex.

[73] Assignee: Owens-Corning Fiberglas Corporation, Toledo, Ohio

[22] Filed: Mar. 28, 1975

[21] Appl. No.: 563,245

Related U.S. Application Data

[63] Continuation of Ser. No. 373,045, June 25, 1973, abandoned.

[52] U.S. Cl. .................................. 156/174; 53/13; 156/193; 156/271; 264/146
[51] Int. Cl.² .................. B65H 81/00; B32B 31/18
[58] Field of Search .......... 156/173, 174, 190, 191, 156/193, 271, 512; 206/380, 391, 401, 446, 226, 225, 321; 53/13; 100/3, 5, 6; 242/7.21, 7.22, 7.23; 138/137; 264/146, 156; 214/10.5 R, 15; 83/1, 29, 85, 86

[56] References Cited
UNITED STATES PATENTS

| | | | |
|---|---|---|---|
| 361,926 | 4/1887 | Caldwell | 206/226 |
| 464,792 | 12/1891 | List | 206/226 |
| 934,938 | 9/1909 | Scherer | 206/321 |
| 1,951,561 | 3/1934 | Robichaud | 206/226 |
| 2,782,805 | 2/1957 | Leadbetter | 138/74 |
| 3,238,864 | 3/1966 | Patterson | 100/3 |
| 3,464,879 | 9/1969 | Paulsen | 156/427 |

*Primary Examiner*—Douglas J. Drummond
*Assistant Examiner*—Michael W. Ball
*Attorney, Agent, or Firm*—John W. Overman; Paul J. Rose

[57] ABSTRACT

Large volume tubular structures, particularly such structures made of reinforced plastic, are slit longitudinally and convolutely coiled to effectively reduce their volume for shipping, handling, or storing. For further volume reducing advantage a plurality of such tubular structures are coiled together in a shippable package. The slit tubes are subsequently reunited or joined together with other tubes for a variety of end uses.

2 Claims, 13 Drawing Figures

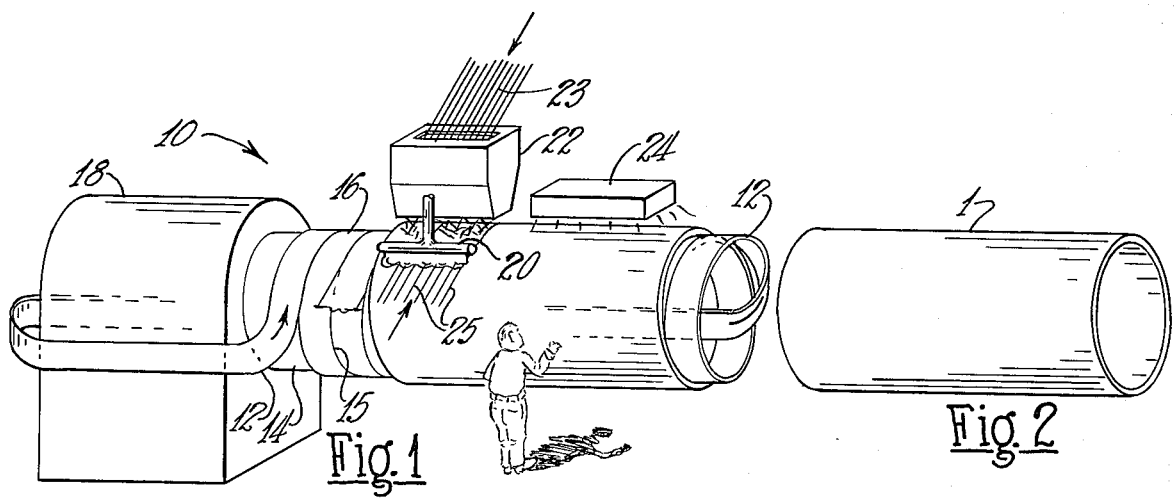
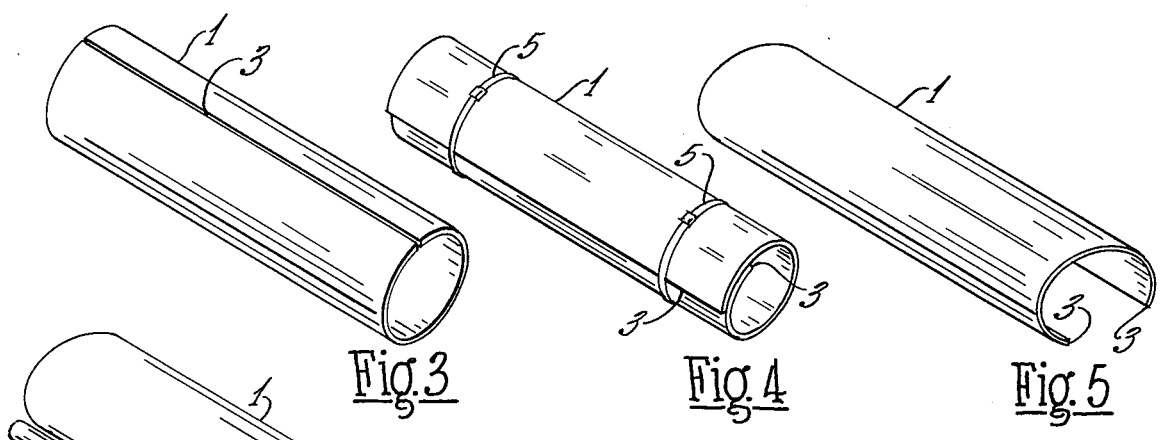
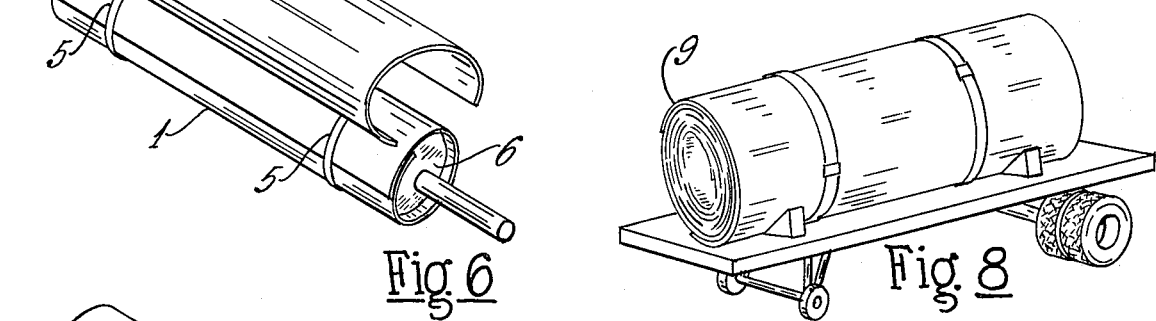
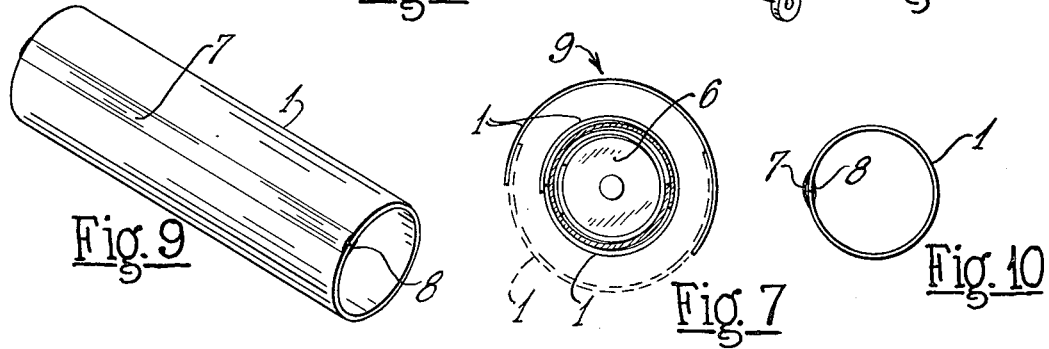

METHOD OF MANUFACTURING LARGE DIAMETER TUBULAR STRUCTURES

This is a continuation of application Ser. No. 373,045, filed June 25, 1973.

The present invention relates to large volume tubular structures such as are used for pipe, tanks, and similar fluid handling devices, and particularly to such structures made of reinforced plastics. Specifically, the invention relates to a method of fabricating and configuring such large tubular structures to effectively reduce their volume for subsequent handling, shipping, and storing.

Pipes, tanks, and other fluid handling structures made of reinforced plastics, especially glass fiber reinforced plastics, have become well known and are now widely used. Reinforced plastics offer the particular properties of high strength to weight ratio and good corrosion resistance. These properties make reinforced plastics particularly well suited for large volume structures such as gasoline and chemical storage tanks, as well as large underground and subaqueous pipe.

Although the invention has particular utility for structures in the range of 8 to 12 feet in diameter, as used in the context of this discussion, "large" typically refers to structures having cross sections equivalent to 2 feet in diameter and greater.

Accompanying the growth in acceptance of these large reinforced plastic structures have been new developments in apparatus and processes for their manufacture. One particularly significant advance was the development of an endless mandrel which makes it possible to produce large tubing of reinforced plastic composite material continuously. The capacity of this machine and the processes developed around it have greatly improved the efficiencies of making large structures in a centralized location.

However, such large scale centralized manufacturing is of limited value unless the production can be readily marketed. Since the cost of shipping large volume structures is high because of the space requirements, the geographical market for distribution from a manufacturing facility is severely limited and the full benefit of mass production could not be realized. Relatedly, the space needed to store these structures makes it uneconomical for long but more efficient production runs.

Accordingly, it is the primary object of the present invention to provide a method of manufacturing, fabricating, and packaging large volume tubular structures, especially those of reinforced plastic, for economical handling, storage, and transportation.

It is also an object of the present invention to provide a method of manufacturing large tubular bodies in a form having greater versatility for subsequent further fabrication.

Finally it is a specific object of the invention to provide a method of manufacturing fluid handling structures suitable for underground application for distribution over a large geographical area.

These and other objects are achieved in the present invention in which a large tubular structure, preferably of reinforced plastic, is modified for handling, storage, and shipment by slitting the wall from end-to-end along one side, convolutely folding the tube to effectively reduce its volume, and securing it in the described coiled configuration during handling or shipment, or until ready for further assembly or fabrication.

It has been shown, by using the method of the invention that the volume of a single large tubular structure can be significantly reduced, thus making the shipping of the structure economically practical. For example, an 8 foot diameter plastic tube, used as the shell of an underground gasoline storage tank, was coiled to about 5 foot in diameter resulting in a 60% effective reduction in volume.

Although reinforced thermosetting resins are frequently used to make large structures that are very rigid, mostt large structures will have some flexibility permitting the practice of the invention. In many cases, especially where the structures is to be used underground, they are intentionally designed with a flexibility which allows a predetermined deflection when installed. Such structures, which are generically described as flexible conduits, use the interaction of the surrounding soil for support. The inventive method would appear to have particular use for these flexible conduits.

Of course, it is readily apparent that the degree of volume reduction for other structures will vary according to the flexibility of the wall of the structure, which is in turn a function of the particular composite material, the wall thickness, and the original diameter. However, by practicing the invention, substantial space savings can be realized with many reinforced plastic structures.

Still greater benefit results from the practice of a further feature of this invention. This feature comprises folding a second shell, slit longitudinally as described, over a shell which has already been coiled and reduced in size. The second shell then occupies only an additional space equal to its own wall thickness, which of course is doubled wherever the shell wall overlaps. Additional shells can be similarly coiled around the first and second shells with the result of a large number of shells occupying the same volume originally occupied by only one shell. For example, referring again to the 8 foot diameter underground tank shells described above, it has been shown that as many as forty such shells can be coiled together on a truck trailer which previously could handle only one unslit shell.

The savings in handling, storing, and shipping to be realized from the reduction in volume of these structures is readily apparent. Furthermore, since techniques for joining the slit edges together without any loss of the strength in the joint area are well known, the invention applies to tubular structures used to make a variety of end products.

The invention has found particularly advantageous use in the manufacture of underground storage tanks for storing gasoline. These tanks typically comprise a cylindrical wall of plastic reinforced with glass fibers, concave end caps integrally joined at each end of the cylinder, and a plurality of spaced circumferentially extending stiffening ribs bonded about the wall. Using the inventive method, the cylindrical bodies of such tanks are manufactured in large volume at a centralized facility, coiled together as taught by the invention and transported to a satelite facility where the end caps and ribs are added to complete the tank.

Another feature of the invention results in that a tubular structure, slit longitudinally as taught, can be circumferentially expanded and joined together with another circumferentially expanded tube to form a still larger structure. Thus it is possible to make a structure larger than the dimensional capacity of the principal manufacturing facility.

Other advantageous features of the invention will be apparent in the following description of the drawings which accompany this disclosure and of which:

FIG. 1 is a perspective view showing schematically an apparatus and process for producing large tubing continuously;

FIG. 2 shows a typical large tubular structure produced by the apparatus and proccess of FIG. 1;

FIG. 3 shows the tube of FIG. 2 slit longitudinally in accordance with the invention;

FIG. 4 shows the tube of FIG. 3 convolutely coiled in accordance with the invention to effectively reduce its volume;

FIG. 5 shows the tube of FIG. 3 expanded circumferentially;

FIG. 6 shows the circumferentially expanded tube of FIG. 5 being placed over a previously coiled tube in accordance with the invention;

FIG. 7 is an end view showing a number of tubes coiled together in a shipping package in accordance with the invention;

FIG. 8 is a view showing the shipping package of FIGS. 6 and 7 placed on a truck trailer;

FIG. 9 shows a typical tube such as that of FIG. 2 in which the wall has been rejoined along the longitudinal slit;

FIG. 10 is an end view of the rejoined tube in FIG. 9;

Figure 11:
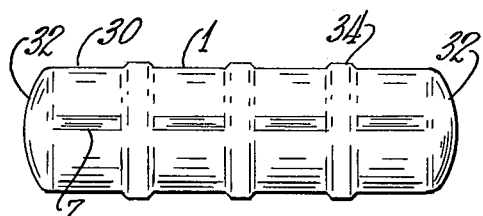
FIG. 11 shows a typical tank structure made using a shell of the type shown in FIG. 3.

Large diameter cylindrical tubes of hardened resin reinforced with glass fibers can be made by a number of well known processes. One particularly successful apparatus and process is shown in FIG. 1. This apparatus is particularly advantageous in that it can be used to produce large tubing continuously at a substantial rate.

The endless mandrel 10, which is described in more detail in U.S. Pat. No. 3,464,879, comprises an endless steel band 12 which circulates continuously around a core 14. The core is supported at the head of the machine 18 which also includes the drive mechanism. The hollow core is not supported at the opposite end. The major portion of the band is helically wrapped in abutting convolutions 15 around the periphery of the core to form a generally smooth forming surface 16 on which resin and reinforcement can be applied. The band advances from the supported end of the care to the free end where it passes back through the center of the core to the supported end. The mandrel surface 16 simultaneously rotates and advances toward the free end of the core.

The equipment associated with the mandrel 10 will vary with the process but usually includes a resin applicator, apparatus for providing a reinforcement, and optionally a heat source to accelerate or control the cure of the composite. In FIG. 1 the resin applicator is indicated generally at 20, and the heat source at 24. A chopper 22 for cutting continous rovings 23 into discrete lengths and depositing them randomly on the mandrel is shown as the reinforcement feeder. In addition, continuous rovings 25 are shown being wound on the mandrel. In some processes, apparatus for providing a particulate filler may also be provided. Many forms of fibrous reinforcement may be used including but not limited to chopped strand mats, cloths, woven rovings, windings of continuous glass filament, or a combination of these forms.

In the operation of a typical process, such as that shown in FIG. 1, the materials to form the composite are fed onto the advancing mandrel surface according to a predetermined sequence. The application may take place over several widths of the endless band producing a gradual build-up of the composite wall. The resin usually forms the matrix and is cured to a self-supporting state before the tubular structure advances off the free end of the mandrel. The tubing is then cut to the desired length.

A typical tube 1 is shown in FIG. 2. As discussed previously, although the tube 1 has a variety of uses for tanks, pipe, and other large structures, the cost of shipping, handling or storing it in the form as shown in FIG. 2 is limiting on many uses.

Accordingly, in accordance with the present invention, the tube 1 can be slit longitudinally from end-to-end at one place on the wall as shown in FIG. 3. The slit tube can then be convolutely coiled with the longitudinal edges 3 in overlapping relationship as shown in FIG. 4. By this simple expedient, the diameter, and consequently the volume, of the tube can be effectively reduced. The tube can be restrained in the coiled configuration in a number of ways, such as by the metal banding or straps 5 as shown in FIG. 4.

The same flexibility which allows the tube to be coiled, as shown in FIG. 4, permits it to be circumferentialy expanded as shown in FIG. 5. In FIG. 6, an expanded tube is shown being placed over a previously coiled tube in accordance with a further feature of the invention. FIG. 6 thus shows a practice by which a substantial number of tubular shells are coiled one-about-another in a shipping package 9, as shown in FIG. 7, having only a fraction of the volume of the otherwise separate tubes. Since the tubes can be expanded, the package 9 can be built-up to a diameter larger than that of any of the tubes as orginally produced. It may be advantageous to coil the tubes around a core 6 such as indicated in FIG. 6 to facilitate loading, unloading, and handling. FIG. 8 shows a packkage 9 of coiled tubes on a truck trailer to illustrate the shipping benefit above described.

In most uses of the tube 2, the slit edges 3 of the wall will be reunited. The technology for bonding abutted surfaces of reinforced plastic composites is available, and a number of methods can be used. In FIG. 9, a tube is shown with a joint 7 comprising a lay-up of mat, woven roving, or other reinforcement and resin over the slit on the exterior of the wall. FIG. 10, is an end view of the tube of FIG. 9, showing the joint 7 comprising several layers of reinforcement in a resin matrix. A lay-up of resin and reinforcement 8 on the interior of the tube wall is also shown, and may be used advantageously to provide a fluid tight seal on the interior surface.

FIG. 11 illustrates a particular use for the tube 1, which was referred to earlier. The tube 1 is provided with integrally joined end caps 32 and circumferential ribs 34 to make a tank especially suited for the underground storage of liquids. For this type of tank, the tube 1 will preferably comprise a matrix of hardened thermosetting resin reinforced predominately with randomly oriented chopped glass strands.

Figure 12:
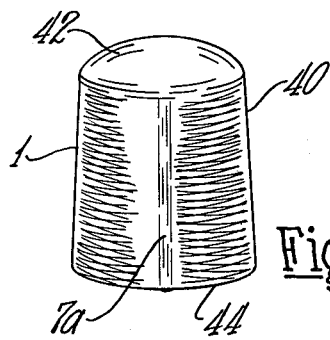
FIG. 12 shows another tank structure made using a shell fabricated in accordance with the method of the invention.

In FIG. 12, another type of tank 40 suited for storing liquids above ground is shown. For this tank the shell 1 will preferably comprise a resin matrix reinforced primarily with a plurality of windings of continuous glass rovings for greater burst strength. The joint 7a for this tank would preferably comprise a reinforcement, such as woven roving, which provides tensile strength transversely to the joint. A base 44 and a cap 42 complete the tank.

Figure 13:
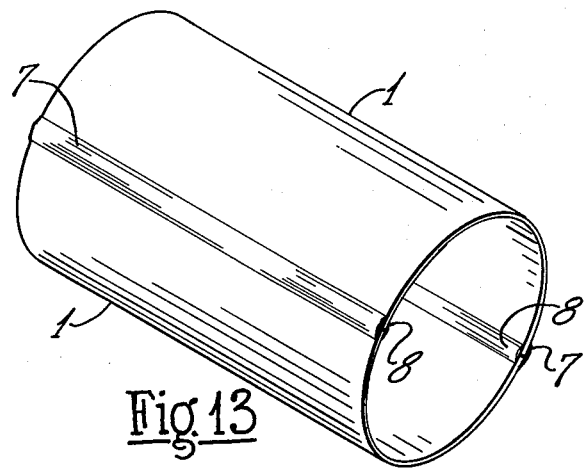
FIG. 13 shows a larger structure made by combining two of the circumferentially expanded tubes of FIG. 5.

Still another application for the slit tube 1 of FIG. 3, emphasizing another feature of the invention, is shown in FIG. 13, where two circumferentially expanded tubes have been joined together to form a tube of still larger volume. The joints can be typically similar to that described with reference to FIGS. 9 and 10.

Another readily apparent application for the tube 1 as shown reunited in FIG. 9, is for pipe. Thus by use of the invention a whole, or substantial part of a pipeline can be produced, packaged, and shipped to the installation site economically. The method of coiling the tubes together can even be used for pipe sections having bell ends.

The above discussion illustrates by example the features of the invention and some of its applications. However, other applications, embodiments and modifications will readily occur to those skilled in the art, and accordingly these variations are within the scope of the invention as defined in the claims which follow.

I claim:

1. A method of making a plurality of tubes of composite resinous material and of substantially equal original diameters and assembling them into a package for shipment, comprising:
    a. forming each of a plurality of slit tubes of substantially uniform wall thickness by depositing hardenable resin and reinforcement on a rotating cylindrical mandrel, curing the resin to form a hardened matrix about the reinforcement and to make a self-supporting tube, removing the tube from the mandrel, and slitting the tube from end to end along one side;
    b. folding a first of the slit tubes so formed convolutely to contract it circumferentialy to a smaller diameter than said original diameter and to provide circumferentially overlapping opposite edge portions;
    c. fastening the first slit tube in the convolutely folded position; and
    d. successively convolutely folding and fastening others of the slit tubes about the convolutely folded and fastened first slit tube in generally tightly coiled relationship to form a package for shipment, each of the convolutely folded and fastened tubes having circumferentially overlapping opposite edge portions.

2. A method as claimed in claim 1 wherein the fastening of each of the slit tubes in its convolutely folded condition is effected by a pair of spaced steel bands.

* * * * *